Figure 1:
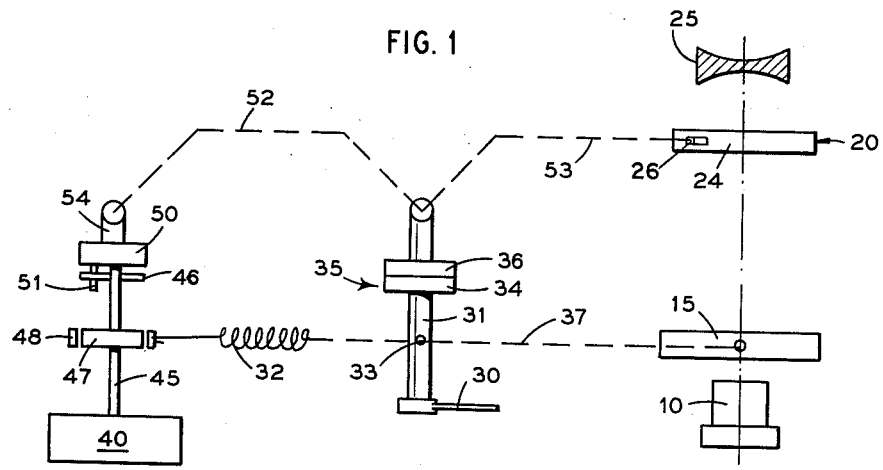

Oct. 30, 1962     R. EDWARDS     3,060,820

AUTOMATIC PHOTOGRAPHIC SHUTTER

Filed Aug. 19, 1955

INVENTOR.

Robert Edwards

BY

*Irving Seidman*

ATTORNEY 3,060,820
AUTOMATIC PHOTOGRAPHIC SHUTTER
Robert Edwards, 3611 Henry Hudson Parkway,
Riverdale, N.Y.
Filed Aug. 19, 1955, Ser. No. 529,497
5 Claims. (Cl. 95—10)

This invention relates to apparatus for automatically controlling the lens or exposure aperture of a camera in response to the indications of a light meter and, more particularly, to such apparatus not requiring any source of power other than the usual shutter operating mechanism of the camera.

In normal photography, the operator sets the size of the light or lens aperture in accordance with the relative ambient brightness. For the best results, the light is measured by a lightmeter, which latter is usually a microammeter connected to measure the output of a photocell. As this technique involves manual reading of the lightmeter followed by manual adjustment of the light aperture size control, there is a substantial possibility of appreciable error in setting the lens aperture control. For this reason, various arrangements have been proposed for automatically controlling the size of the lens aperture in response to the indications of the light meter. However, the power output of the photocell is so small that it cannot be used to operate the aperture control. Consequently, resort has been to relay systems involving a sensitive relay operated by the photocell output and controllably modulating the flow of current from a battery to an electromotive device for operating the aperture control. These arrangements, due to the battery, relay, and electromotive device, have added undesirable bulk, weight, and expense to the camera and, consequently, have not found commercial acceptance.

In accordance with the present invention, adjustment of the lens aperture control is powered by the shutter operating mechanism under the automatic control of the light meter. Thus, no relay, battery, or electromotive operator is required so that the invention control is compact, very light in weight, and relatively inexpensive.

More specifically, the armature shaft of the microammeter is extended and carries a balanced stop and a brake drum. The balanced stop cooperates with abutment means on the aperture control, but normally is unobstructed thereby so that no restraint is exerted on the microammeter shaft of the light meter. The brake drum has normally disengaged brake means cooperable therewith.

The shutter operating mechanism is connected to the brake means and to the aperture controls by slip connections, such as clutches, springs or the like. During the first five to ten degrees of movement of the shutter operating lever, the brake means is clamped on the brake drum on the microammeter shaft to lock the shaft in its position set by the light values measured by the photocell. Continued movement of the shutter operating lever moves the lens aperture control toward the closed position until the abutment means engages the balanced stop. The slip connections allow further movement of the shutter operating lever to operate the shutter.

Figure 2:
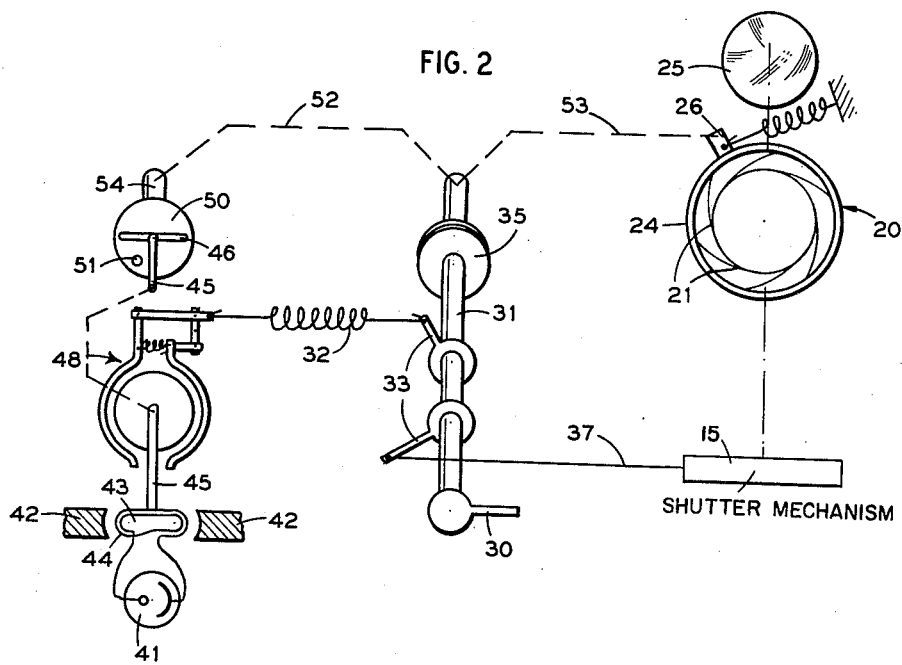

For an understanding of the invention principle, reference is made to the following description to a typical embodiment thereof as illustrated in the accompanying drawing. In the drawing:

FIG. 1 is a somewhat schematic plan view of apparatus embodying the invention; and FIG. 2 is an exploded schematic view illustrating the apparatus.

Referring to the drawings, the camera is schematically illustrated as including a lens tube 10, a shutter mechanism 15, a lens diaphragm size control 20, and a lens 25, all arranged in line in front of a film to be exposed. Shutter mechanism 15 may be of any conventional type which, when operated, momentarily allows light to pass therethrough.

Diaphragm mechanism 20 includes the usual curved vanes 21 which, upon rotation of a ring 24, vary the size of the opening through which light passes to lens 25 and to the film. Ring 24 is driven by an operator 26.

In accordance with the present invention, the operation of lever 30 in operating shutter 15 is used to automatically adjust the opening in diaphragm mechanism 20 in accordance with the ambient light value indications of a light meter 40. The latter is a conventional form of light meter including a light-responsive photocell 41 whose output is measured by a microammeter including a permanent magnet having poles 42, 42 and an armature 43 on a light pivot shaft 45. Armature 43 carries a winding 44 connected to the output of photocell 41 so that the angular position of armature 43 between poles 42, 42 corresponds to the light incident upon photocell 41. This value is indicated by a needle carried by shaft 45 and moved over a scale by armature 43, the needle and scale not being illustrated.

To use light meter 40 to control the opening of diaphragm mechanism 20, shaft 45 carries a balanced stop 46 which is cooperable with an abutment 51 on a disk 50 or the like directly connected mechanically to separator 26 of mechanism 20 as schematically indicated at 52–53. For illustrative purposes only, disk 50 is shown as having a mounting shaft 54 and as acting as a bearing for extended shaft 45.

The connections 52–53 mechanically interconnect disk 50 and operator 26 to the driven disk 36 of a slip clutch, or equivalent slipping drive for conjoint operation thereby. Drive 35 has a driving element 34 which is secured to a shaft 31 mounting lever 30.

Microammeter shaft 45 also carries a brake drum or disk 47 surrounded by a normally released clasp brake generally indicated at 48. A spring 32 and a pin 33, representing any conventional slip or over-run drive, connect brake 48 to shaft 31. Pin 33 is indicated, in duplicate in FIG. 2 for clarity of illustration, as connected to the shutter mechanism by a connection 37.

The arrangement operates as follows. Normally, brake 48 is completely disengaged from disk 47 and, with mechanism 20 completely open, abutment 51 is out of the usual range of movement of balanced stop 46. Under these conditions, shaft 45 and armature 43 are free to move without restraint in response to light values measured by photocell 41. Stop 46 will thus assume a definite angular position corresponding to the reading of light meter 40.

When it is desired to take a picture, lever 30 is moved to operate shutter 15. During the initial 5 to 10 degrees of movement of lever 30, brake 48 is clamped firmly on disk 47 by pin 33 and spring 32, thus locking shaft 45 and holding stop 46 firmly in its light value adjusted position. Spring 32 (or an equivalent overrun or slip connection) allows continued movement of lever 30.

At the same time, lever 30 rotates diaphragm mechanism 20 toward a closed position through slip clutch 35 and connection 53, also rotating disk 50 and stop 51 through connection 52 and shaft 54. When stop 51 engages stop 46 on shaft 45, further movement of mechanism 20 is interrupted.

However, slip clutch 35 allows continued movement of lever 30 to complete the operation of shutter 15. The diaphragm mechanism and the lever are then released to return to their initial positions.

It will be noted that the only power required is derived from the operating lever, thus eliminating any auxiliary power source, relay, or electromotor.

While a specific embodiment of the invention has been shown and described in detail to illustrate the application of the invention principle, it will be understood that the invention may be embodied otherwise without departing from such principle.

What is claimed is:

1. In combination with a camera having a shutter, a lens diaphragm mechanism having an operator, and a shutter operating lever; a light meter having an oscillatable indicator shaft; a stop secured to said shaft; an abutment secured to move with said operator and arranged in the path of movement of said stop but normally beyond the range of movement of the latter; means operable by said operating lever, at the start of its shutter operating movement, to clamp said shaft against rotation to hold said stop against movement; driving means for said operator and said abutment; and slip means connecting said operating lever to said driving means, whereby said driving means is operable by said operating lever during its shutter operating movement to move said operator to move said diaphragm mechanism in a diaphragm closing direction; said abutment engaging the then immovable stop to limit the closing movement of said mechanism and said slip means providing for completion of the movement of the operating lever to operate said shutter.

2. In combination with a camera having a shutter, a lens diaphragm mechanism having an operator, and a shutter operating lever; a light meter having an oscillatable indicator shaft; a balanced stop secured to said shaft; an abutment secured to move with said operator and arranged in the path of movement of said stop but normally beyond the range of movement of the latter; means operable by said operating lever, at the start of its shutter operating movement, to clamp said shaft against rotation to hold said stop against movement; driving means for said operator and said abutment; and slip means connecting said operating lever to said driving means, whereby said driving means is operable by said operating lever during its shutter operating movement to move said operator to move said diaphragm mechanism in a diaphragm closing direction; said abutment engaging the then immovable stop to limit the closing movement of said mechanism and said slip means providing for completion of the movement of the operating lever to operate said shutter.

3. In combination with a camera having a shutter, a lens diaphragm mechanism having an operator, and a shutter operating lever; a light meter including a photocell and a microammeter connected to the output of said photocell and having a shaft; a balanced stop secured to said shaft; an abutment secured to move with said operator and arranged in the path of movement of said stop but normally beyond the range of movement of the latter; means operable by said operating lever, at the start of its shutter operating movement, to clamp said shaft against rotation to hold said stop against movement; driving means for said operator and said abutment; and slip means connecting said operating lever to said driving means, whereby said driving means is operable by said operating lever during its shutter operating movement to move said operator to move said diaphragm mechanism in a diaphragm closing direction; said abutment engaging the then immovable stop to limit the closing movement of said mechanism and said slip means providing for completion of the movement of the operating lever to operate said shutter.

4. The combination claimed in claim 3 in which said shaft clamping means comprises normally disengaged braking means for said shaft and a brake operator including a slip connection between said braking means and said operating lever.

5. The combination claimed in claim 3 in which said abutment projects from an element rotatable on an axis concentric with said shaft into the arc of movement of said stop.

References Cited in the file of this patent

UNITED STATES PATENTS

| 2,148,963 | Rauch | Feb. 28, 1939 |
| 2,187,953 | Schmidt | Jan. 23, 1940 |
| 2,213,742 | Mihalyi | Sept. 3, 1940 |
| 2,282,659 | Kun | May 12, 1942 |
| 2,325,463 | Axler et al. | July 27, 1943 |

FOREIGN PATENTS

| 802,940 | France | June 22, 1936 |
| 806,416 | France | Sept. 21, 1936 |